US006607303B2

United States Patent
Ngo et al.

(10) Patent No.: US 6,607,303 B2
(45) Date of Patent: Aug. 19, 2003

(54) ANGLED OPTICAL CONNECTOR MOUNTING ASSEMBLY

(75) Inventors: Hung Viet Ngo, Harrisburg, PA (US); Ryan T. Benner, Lancaster, PA (US)

(73) Assignee: FCI USA, Inc., Etters, PA (US)

( * ) Notice: Subject to any disclaimer, the term of this patent is extended or adjusted under 35 U.S.C. 154(b) by 0 days.

(21) Appl. No.: 09/909,608

(22) Filed: Jul. 20, 2001

(65) Prior Publication Data

US 2002/0064349 A1 May 30, 2002

Related U.S. Application Data

(63) Continuation-in-part of application No. 09/726,242, filed on Nov. 29, 2000, now Pat. No. 6,572,272.

(51) Int. Cl.$^7$ .............................. G02B 6/36; G02B 6/38
(52) U.S. Cl. ........................... 385/53; 385/55; 385/60; 385/76
(58) Field of Search .............................. 385/53, 88, 89, 385/134, 135, 55, 58, 76, 56, 60

(56) References Cited

U.S. PATENT DOCUMENTS

| | | | |
|---|---|---|---|
| 2,460,636 A | 2/1949 | Holloway | |
| 3,387,253 A | 6/1968 | Salners | |
| 4,119,359 A | 10/1978 | Schultz | 339/128 |
| 4,386,814 A | 6/1983 | Asick | 339/14 R |
| 4,840,451 A | 6/1989 | Sampson et al. | 350/96.2 |
| 4,869,566 A | 9/1989 | Juso et al. | 350/96.2 |
| 4,913,511 A | 4/1990 | Tabalba et al. | 350/96.2 |
| 5,082,344 A | 1/1992 | Mulholland et al. | 385/60 |
| 5,123,071 A * | 6/1992 | Mulholland et al. | 385/53 |
| 5,142,597 A * | 8/1992 | Mulholland et al. | 385/56 |
| 5,302,140 A | 4/1994 | Arnett | 439/544 |
| 5,317,105 A | 5/1994 | Weber | 174/35 GC |
| 5,757,997 A | 5/1998 | Birrell | 385/60 |
| 5,767,999 A | 6/1998 | Kayner | 359/163 |
| 5,879,173 A | 3/1999 | Poplawski et al. | 438/138 |
| 5,937,121 A * | 8/1999 | Ott et al. | 385/59 |
| 5,959,244 A * | 9/1999 | Mayer | 174/35 GC |
| 5,960,136 A | 9/1999 | Shakhman et al. | 385/53 |
| 6,066,001 A | 5/2000 | Liptak et al. | 439/607 |
| 6,085,006 A | 7/2000 | Gaio et al. | 385/92 |
| 6,146,192 A * | 11/2000 | Cabalka et al. | 439/540.1 |
| 6,149,444 A | 11/2000 | Shi et al. | 439/95 |
| 6,160,946 A * | 12/2000 | Thompson et al. | 385/134 |
| 6,167,183 A * | 12/2000 | Swain | 385/134 |
| 6,193,420 B1 * | 2/2001 | Sikorski, Jr. | 174/67 |
| 6,305,961 B1 * | 10/2001 | Szilagyi et al. | 439/271 |
| 6,335,996 B1 * | 1/2002 | Yamaguchi | 385/134 |
| 2002/0090176 A1 * | 7/2002 | Smeltz et al. | 385/53 |
| 2002/0159712 A1 * | 10/2002 | Holmquist | 385/70 |
| 2002/0172469 A1 * | 11/2002 | Benner et al. | 385/55 |

FOREIGN PATENT DOCUMENTS

| | | |
|---|---|---|
| EP | 0887893 A3 | 11/1999 |
| WO | WO 99/36997 | 7/1999 |

* cited by examiner

*Primary Examiner*—Brian Healy
*Assistant Examiner*—Daniel Valencia
(74) *Attorney, Agent, or Firm*—Harrington & Smith, LLP

(57) ABSTRACT

An optical connector adapter mount for mounting optical connectors to a panel. The mount comprises a frame with a frame with a mounting section and a tubular housing section. The mounting section attaches the mount to the panel. The tubular housing section has an aperture adapted for connecting at least one pair of optical connectors to one end of the housing section. The mounting section is slanted relative to the housing section. At least one section of the aperture is aligned with a hole in the panel, and the one pair of optical connectors are angled relative to a normal axis of the panel when the mounting section is mounted to the panel.

4 Claims, 9 Drawing Sheets

ANGLED OPTICAL CONNECTOR MOUNTING ASSEMBLY

CROSS-REFERENCE TO RELATED APPLICATION(S)

This application is a continuation in part from U.S. application Ser. No. 09/726,242, filed Nov. 29, 2000, now U.S. Pat. No. 6,572,272 which is incorporated by reference herein in its entirety.

BACKGROUND OF THE INVENTION

1. Field of the Invention

The present invention relates to optical connectors and, more particularly, to an assembly for connecting one set of optical connectors to another set of optical connectors at an angle relative to a frame on which the assembly is mounted.

2. Brief Description of Earlier Developments

U.S. Pat. No. 5,082,344 discloses an example of a conventional optical connector adapter assembly for connecting optical connectors of two optical conductor assemblies to each other. The adapter assembly includes a housing with flanges to connect the adapter assembly to a support member, such as for example a panel of an electronic component. The flanges hold the adapter housing perpendicular to a through-hole in the panel. Optical connectors are mounted straight to the ends of the adapter assembly. Accordingly, free or open space is provided in front or behind the adapter assembly mounted in this configuration. In addition, there needs to be enough room at the connection site to allow a user to insert and remove the optical connectors from the adapter assembly. This results in additional open space to be provided in front and behind the adapter assembly.

Moreover, a number of conventional adapter assemblies may be arranged on the panel to connect a multiple optical connectors to each other. Hence, the demand for open space used for inserting and removing connectors is increased even more in the case where multiple optical connectors are connected to the panel. However, the availability of free or open space, especially inside electronic components, is very limited. The reason for this is the continued desire on the part of users for ever smaller electronics. Providing a large amount of open space in front and behind the adapter assembly to insert and remove optical connectors limits reduction in size of electro-optical devices. Hence, in order to provide small, compact electro-optical devices, there is an ever-present desire to shrink the size of open spaces in front and behind the adapter. There is also a desire to allow the optical connectors to be attached to each other at a non-perpendicular angle to a plane of the back plane or back panel. The positioning of the adapter can ensure, for example, that any light transmitted by the connector after un-mating is projected towards the floor, protecting the operator.

Electro-optical components in electro-optical devices are susceptible to EMI from surrounding electro-magnetic radiation. Thus, it is also desired to prevent emissions through panel holes used for interfacing optical connectors to a device. U.S. Pat. No. 5,960,136 discloses one example of a conventional EMI shield arrangement wherein a conductive shield is formed around a multiple optical connector. Another example of a conventional EMI shield arrangement is disclosed in U.S. Pat. No. 6,085,006. Here, a thin metallic sheet is placed around the mechanical connection between the component and optical connectors. Conventional EMI shields used to prevent emissions from optical connectors interfaced to a device are mounted on the optical connector or on the component. This results in large number of EMI shields used in conventional configurations to effectively prevent emissions from optical connectors (e.g. each component is shielded, or each connector is shielded). The present invention overcomes the problems of conventional EMI shield configurations.

SUMMARY OF THE INVENTION

In accordance with a first embodiment of the present invention, an optical connector adapter mount is provided. The optical connector adapter mount is used for mounting optical connectors to a panel. The mount comprises a frame with a mounting section, and a tubular housing section. The mounting section is used for attaching the mount to the panel. The tubular housing section has an aperture adapted for connecting at least one pair of optical connectors to end of the housing section. The mounting section is slanted relative to the housing section. At least one section of the aperture is aligned with a hole in the panel, and the pair of optical connectors are angled relative to a normal axis of the panel when the mounting section is mounted to the panel.

In accordance with a second embodiment of the present invention, a combined optical connector adapter and mount assembly is provided. The assembly comprises a mount, and at least one adapter connected to the mount. The mount is adapted to be connected to a frame, and extend through a hole in the frame. The adapter is adapted to connect the set of optical connectors at one end of the adapter to another set of optical connectors at another end of the adapter. At least on optical connector from the set of optical connectors is disposed at an acute angle relative to a center axis of the hole.

In accordance with a method of the present invention, a method for connecting a set of optical connectors to a panel is provided. The method comprises the steps of connecting at least one optical connector adapter to an adapter mount, mounting the adapter mount to the panel, and connecting the set of optical connectors to one end of the optical connector adapter. The optical connectors adapter is slanted relative to the panel with at least one section of the adapter being aligned with a hole in the panel. When the set of optical connectors are connected to one end of the optical connector adapter, at least one optical connector from the set is angled relative to an axis normal to the panel.

In accordance with the third embodiment of the present invention, an optical connector housing gasket is provided. The gasket comprises first and second sides, and spring fingers. The spring fingers project from both the first and second sides of the gasket.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
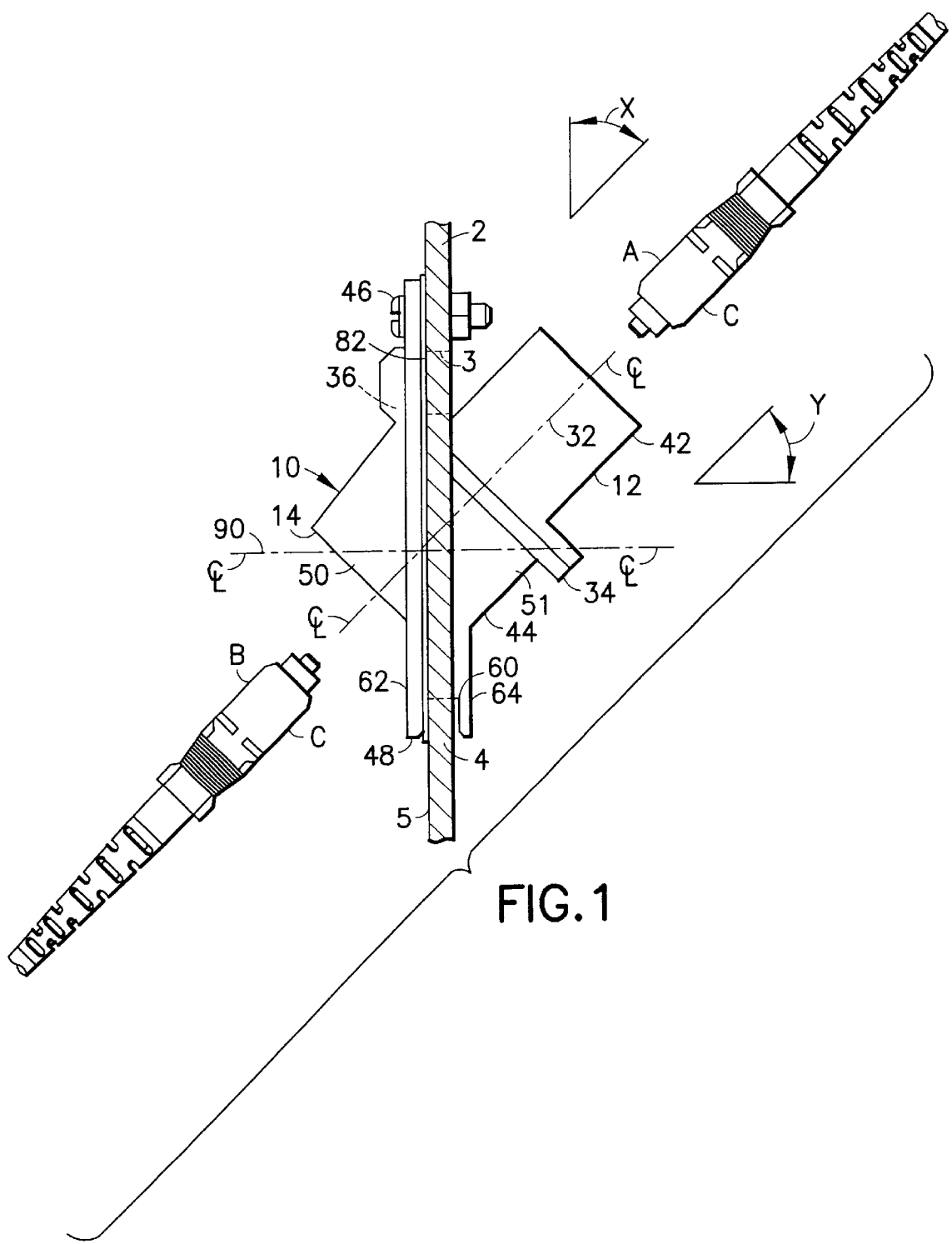
FIG. 1 is a side view of an optical connector assembly attached to a panel (shown in cross-section) and two optical conductor assemblies A, B intended to be connected to each other inside the assembly, the optical connector assembly incorporating features of the present invention in accordance with a first preferred embodiment.

Referring to FIG. 1, there is shown a side view of an optical connector assembly 10, in accordance with a first preferred embodiment of the present invention, attached to a support member 2 (shown in cross-section) and two optical conductor assemblies A, B intended to be connected to each other inside the assembly 10. Although the present invention will be described with reference to the single embodiment shown in the drawings, it should be understood that the present invention can be embodied in many alternate forms of embodiments. In addition, any suitable size, shape or type of elements or materials could be used.

The assembly 10 generally comprises an optical connector adapter 12, a mount 14, and a gasket 82. The adapter 12 is installed in the mount 14, which is mounted in turn to support member 2. The support member 2 may be a back panel of an electronic device. The gasket 82 is connected to the mount 14 to prevent EMI emissions through the hole in the panel 2. The mount 14 holds the adapter 12 at an angle relative to the panel 2.

Figure 2:
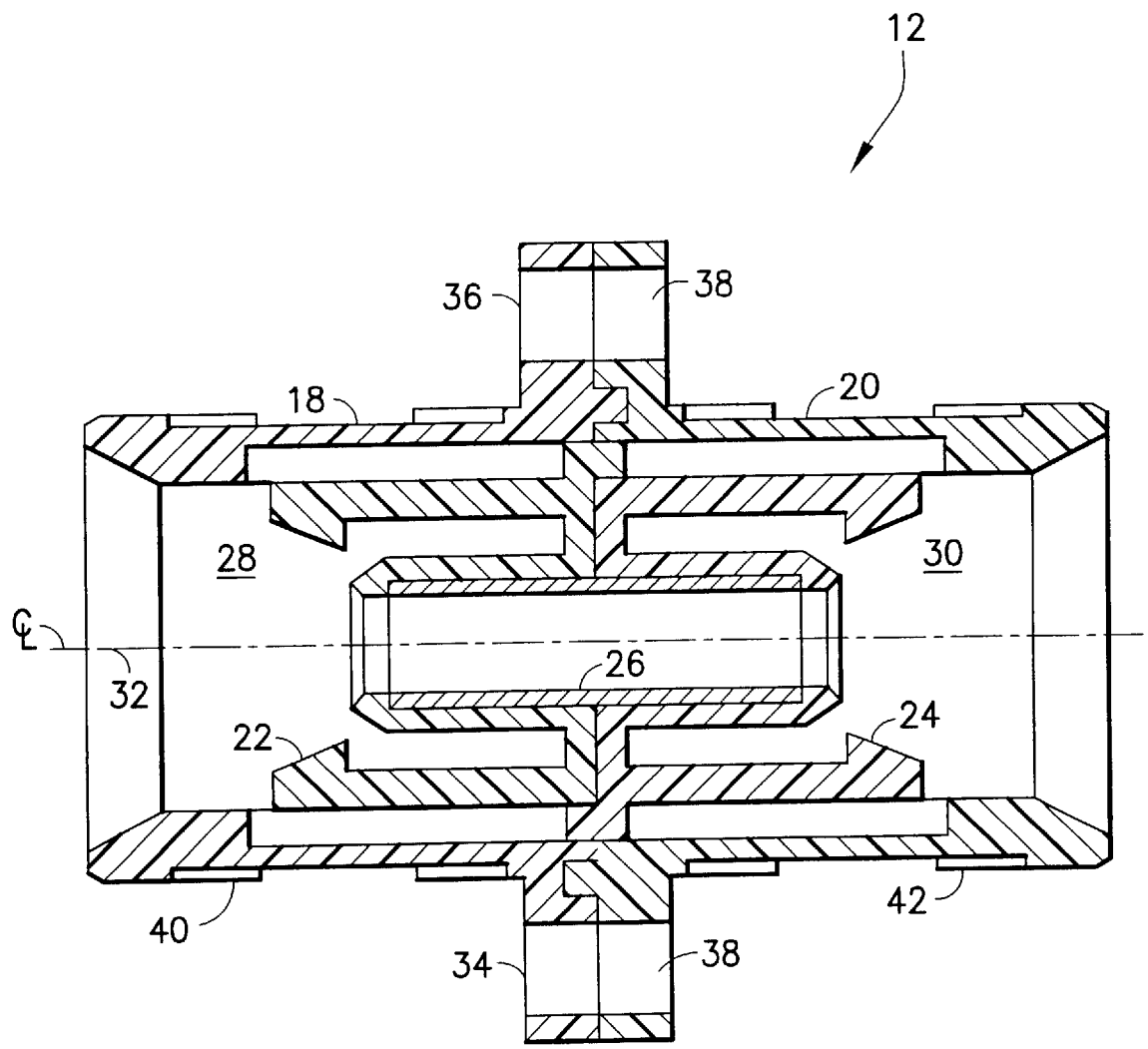
FIG. 2 is a cross-sectional view of an optical connector adapter used in the optical connector assembly shown in FIG. 1.

Referring also to FIG. 2 the adapter 12 generally comprises a housing 16 comprised of two outer housing pieces 18, 20, two inner housing pieces 22, 24, and a sleeve 26. However, any suitable type of adapter could be used as will be described in greater detail below.

For example, the adapter could be a SC simplex adapter, a SC—SC duplex adapter sold under part number 74811 by FCI USA, Inc., a Low Profile LC simplex adapter sold under part number 74884 by FCI USA, Inc., or a LC duplex adapter. In the embodiment shown, the adapter 12 is a SC/SC simplex adapter with flanges sold under part 74885 by FCI USA, Inc. The adapter 12 has two receiving areas 28, 30 for receiving SC connectors C along a centerline axis 32 to mate the SC connectors C to each other. The pieces 18, 20, 22, 24 are preferably comprised of plastic and are ultrasonically welded to each other. The inner pieces 22, 24 form deflectable snap-locks for the connectors C of the optical conductor assemblies A, B. The outer pieces 18, 20 form mounting flanges 34, 36 with fastener holes 38. The adapter 12 can be attached directly to the panel 2 (or to any suitable support member such as a printed circuit board) without the mount 14. In that case, one of the ends 40 or 42 of the adapter may be placed through a hole in the panel, and the flanges positioned against the panel. Thus, as is known in the art, the adapter 12 can be attached to another member as a perpendicular type of adapter, with the centerline axis 32 generally parallel or coaxial with the centerline axis 90 of the hole through which the adapter is located. However, as noted above, the present invention applies equally to any suitable type of adapter such as a LC adapter (not shown). The LC adapter has general features which are similar to the SC adapter, although specific features for coupling LC connectors to the adapter are different than the features of the SC adapter (used to couple SC connectors). For example, unlike the SC adapter, the LC adapter (not shown) has a configuration corresponding to a standard RJ-45 telephone style jack and is substantially smaller than the SC adapter 14 shown in FIG. 2.

Figure 3:
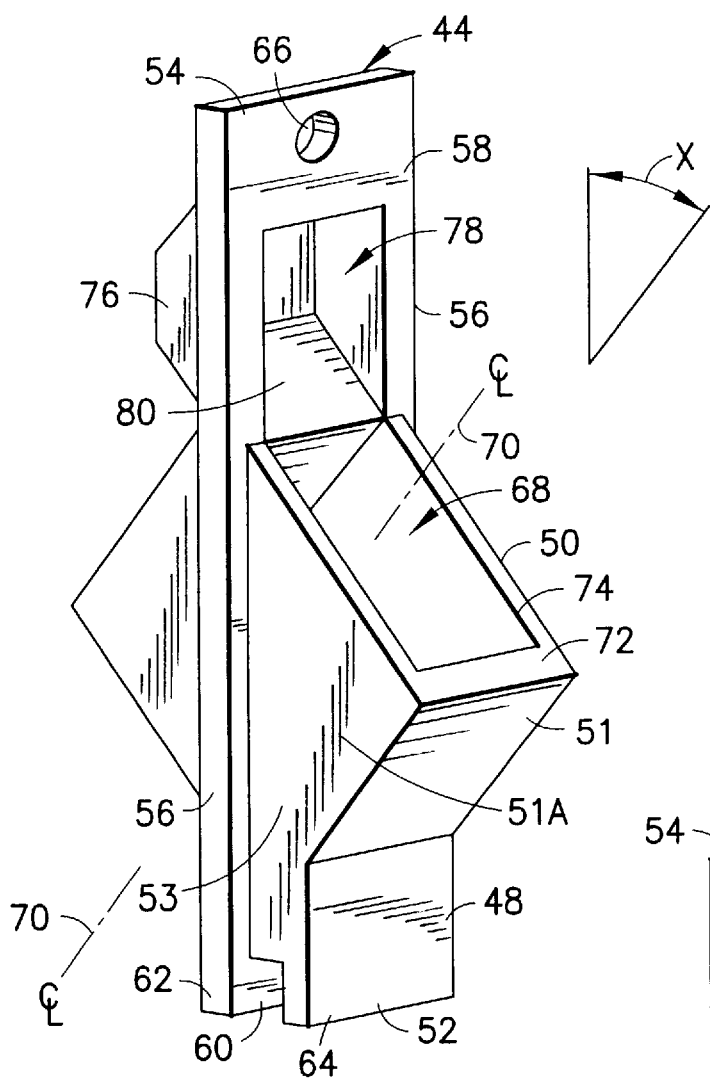
FIG. 3 is a perspective view of a mount used in the optical connector assembly shown in FIG. 1.
Figure 4:
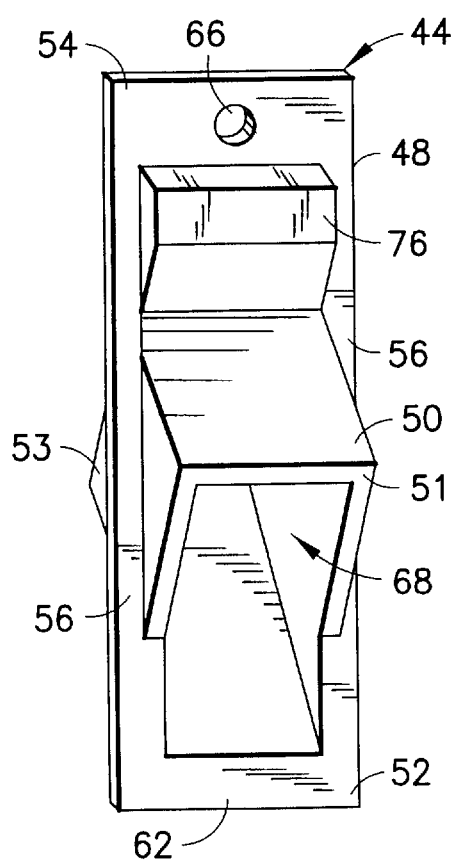
FIG. 4 is a perspective view of an opposite side of the mount shown in FIG. 3.

The mount 14 of the present invention is provided to allow the adapter 12 to be connected to another member in a non-perpendicular or angled type of connection. Referring also to FIGS. 3 and 4, mount 14 preferably comprises a conductive (e.g.: metal) one-piece member or housing 44 and a single fastener 46 (see FIG. 1). In an alternate embodiment the housing 44 could be comprised of multiple members, could be comprised of any suitable material(s), and could have any suitable shape. The mount could also have more than one fastener. The fastener 46 in this embodiment generally comprises a nut and bolt, but any suitable type of fastening system could be provided including a fastener or fastening system integrally formed with the housing 44.

The housing 44 generally comprises a first mounting section 48 and a second adapter connection section or housing 50. The first section 48 generally comprises a bottom end 52, a top end 54 and side flanges 56. The first section 48 forms a generally planar surface 58 on one side of the flanges 56, top end 54 and a part of the bottom end 52. The bottom end 52 includes a recess or slot 60 between a portion 62 having a part of the surface 58 and a portion 64. The top end 54 includes a hole 66 for the fastener 46. However, in alternate embodiments the first section 48 could have any suitable shape which is adapted to attach the mount to the frame 2. For example, rather than the bottom end 52 having an interlocking slot 60, the bottom end 52 could have a hole similar to hole 66 and another fastener could be used to attach the bottom end to the frame 2. Alternatively, any suitable connection of the mount 14 to the frame 2 could be provided. The mount 14 could also be shaped such that it does not extend through the hole 3 in the frame 2.

The second adapter connection section or housing 50 generally comprises a box or tube shaped section 51 located between the two ends 52, 54. However, the second section 50 could have any suitable shape adapted to connect the adapter 12 to the mount. As seen best in FIG. 1, the mounting section 48 and tubular housing section 51 are slanted relative to each other. In this embodiment the tubular section 51 has a through-hole or aperture 68 which is generally aligned with the tubular section. The aperture 68 has a centerline axis 70 which is angled relative to the mounting section 48 and the plane of the surface 58. In a preferred embodiment the angle X is about 45°. However, any acute angle could be provided. The tube shaped section 51 includes a ledge 72 (see FIG. 3) at an entrance 74 into the aperture 68. The dimensions of the aperture 68 are about the same as the outer dimensions of the end 40 of the adapter 12. Thus, the end 40 can be slid into the aperture 68 through the entrance 74. The second section 50 also includes a pocket section 76. The pocket section 76 has a recess or pocket 78.

A bottom of the pocket 78 forms a ledge 80 at an opposite end of the entrance 74 from the ledge 72. The pocket 78 provides an open area to accommodate the flange 36 of the adapter 12. The flange 36 can rest against the ledge 80 and the flange 34 can rest against the ledge 72. However, in alternate embodiments the pocket section 76 might not be provided.

In a preferred embodiment the adapter 12 is fixedly attached to the housing 44. For example, the two housings 44 and 40 could be ultrasonically welded to each other, or bonded to each other, or mechanically attached to each other by a spring clip or snap-lock latch system. However, any suitable connection could be provided. In an alternate embodiment features of the adapter 12 could be integrally formed with the housing 44. Thus, features of the present invention could be comprised in a dedicated angled adapter that did not use a perpendicular type adapter to form a mount/adapter assembly. However, the present invention provides the feature of the ability to use a single type of adapter to provide either a perpendicular type of mounting arrangement for connecting connectors C to each other perpendicular to a plane of a planar section of another member, or a non-perpendicular or angled type of mounting arrangement for connecting connectors C to each other at an acute angle to the plane merely by additional use of the mount 14.

As seen in FIG. 1, the panel 2 is provided with a hole 3 having a centerline axis 90. The centerline axis 90 is substantially normal to the panel 2. The panel 2 has a section 4 at the bottom of the hole 3. When the mount 14 is attached to the panel 2 the tube section 51 extends through the hole 3. The section 4 of the panel 2 is received in the receiving area 60 at the bottom end 52. The surface 58 is located against the side 5 of the panel 2 or, alternatively, a gasket 82 could be provided with the conductive housing 44. The fastener 46 extends through the hole 66 and attaches the top end 54 to the panel 2. Sides 53 of the tube section 51 can contact sides of the hole 3. Thus, the mount 14 can be fixedly and stationarily attached to the panel 2. With the adapter 12 connected to the mount 14, and the mount 14 connected to the panel 2, the centerline 32 of the receiving areas 28, 30 is angled relative to the centerline 90 of the hole 3 at an angle Y. In a preferred embodiment the angle Y is about 45°. However, any suitable acute angle could be provided. Thus, the connectors C can be connected to each other at angle X relative to the plane of the panel 2 and hole 3.

The present invention also provides the feature of increased safety to a user who removes the assembly B from the front of the panel 2. More specifically, because of the angled mount 14, if the connector C of the assembly B is removed from the adapter 12, light passing out of the assembly A at its connector C will be directed downward towards the ground or floor. Thus, there is significantly reduced risk that the light will impact the user's eyes and perhaps cause damage to the user's eyes.

Figure 5:
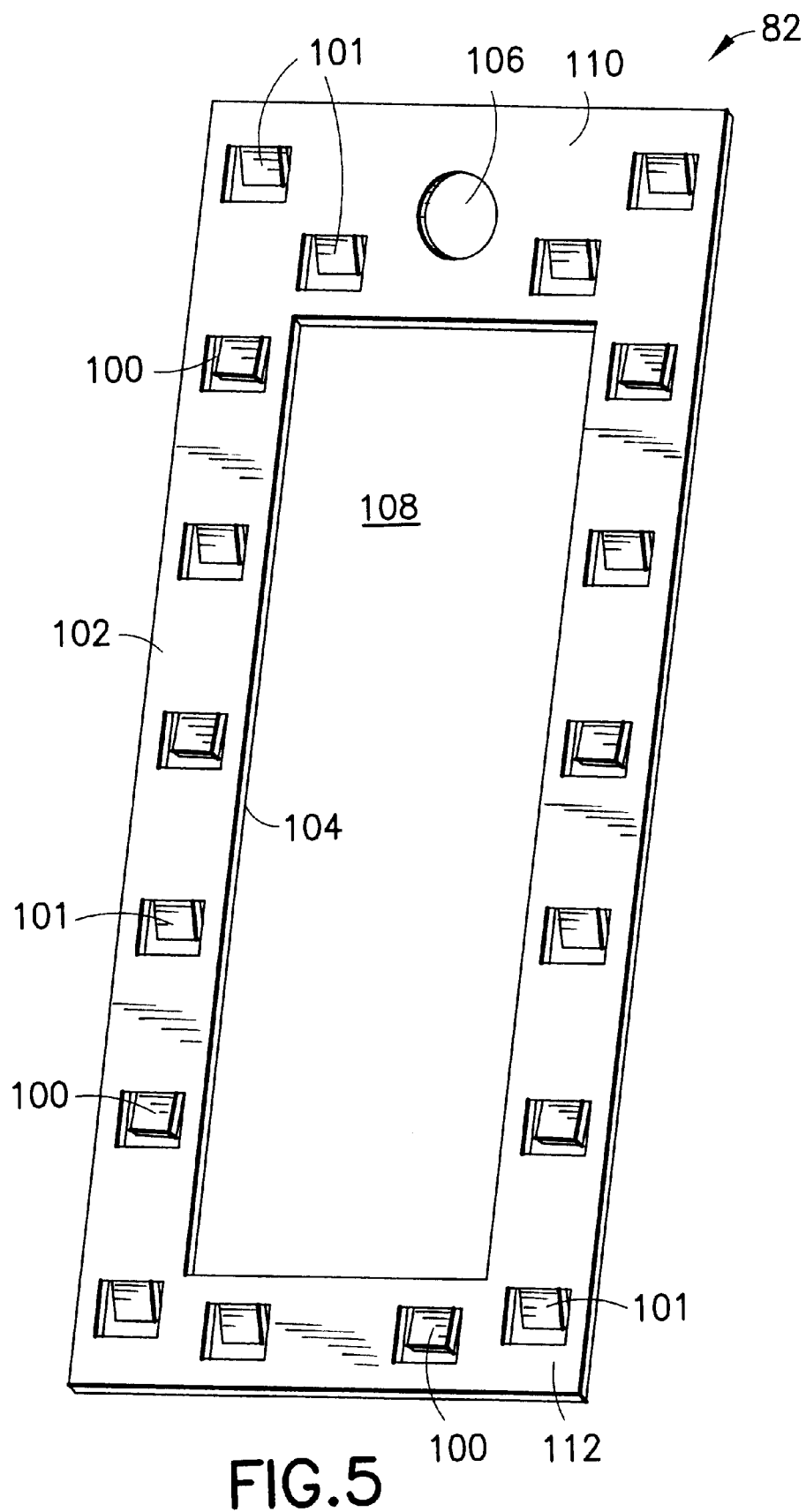
FIG. 5 is a perspective view of the gasket shown in FIG. 1.
Figure 6:
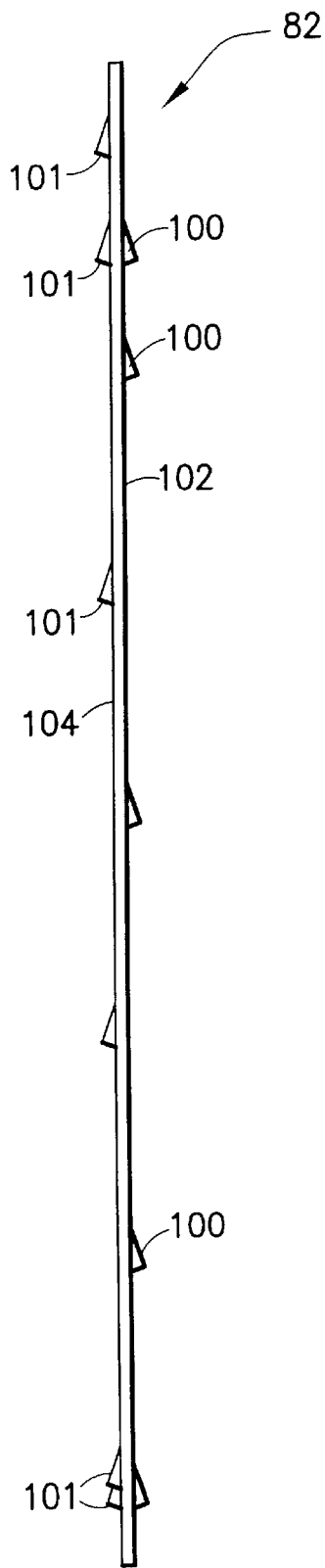
FIG. 6 is a side elevation view of the gasket shown in FIG. 5.

As noted above, the housing 44 can be comprised of a conductive material, such as metal, and can function as a shield to help prevent EMI emissions from passing through the hole 3. FIGS. 5 and 6 respectively show a perspective view and a side elevation view of the gasket 82. The gasket 82 is substantially flat and is cut or stamped from sheet metal of suitable thickness. The metal is preferably phosphor-bronze, or cartridge brass, though the gasket may be formed from any other suitable conductive sheet metal. As can be seen in FIG. 5, gasket 82 has a generally rectangular shape and is sized to generally cover the planar seating surface 58 of the mount's mounting section 48 (see FIG. 3). In alternate embodiments, the gasket may have any suitable shape and size. Gasket 82 has a hole 103 which may be stamped or cut therein. As seen in FIG. 5, the hole 108 is generally rectangular in shape and is sized to admit a diagonal section 51A (see FIG. 3) of tube housing 51. In addition, the hole 108 in gasket 82 extends longitudinally such that pocket 78 in the mounting section remains uncovered when the gasket 82 is disposed against the mount seating surface 58. This allows the flange of the adapter 12 to extend through the hole 108 in gasket 82 into recess 78. The top portion 110 of the gasket 82 has a fastener hole 106. The bottom portion 112 of gasket 82, below hole 108, is sized to fit in the receiving area 60 at the bottom end 52 of the mount's mounting section. The gasket 82 has spring tabs 100, 101 which are disposed generally equally around hole 108. The spring tabs 100, 101 may be either punched or cut in the gasket material. As seen best in FIG. 6, spring tabs 100 project from one face 102, and spring tabs 101 project from the opposite face 104 of the gasket 82. In alternate embodiments, the gasket may have another suitable type of spring disposed on the opposite sides or faces of the gasket. For example, the gasket may have spring tabs or fingers, which project in opposing directions, that are cantilevered from the outer periphery of the gasket. In other alternate embodiments, the opposing sides of the gasket may be coined in opposite directions (e.g. forming a number of opposing ridges in the gasket). As can be seen in FIG. 5, spring tabs 100, projecting from face 102, are located in an alternate consecutive manner with tabs 101 projecting from face 104.

As can be realized from FIG. 1, the gasket 82 is assembled with the mount 14 before the mount is mounted on the panel 2. To assemble the mount 14 and gasket 82, the gasket is merely placed against the seating surface 58 of the mount. As noted before, a diagonal section 51A of the housing 57 extends through the gasket hole 108 when the gasket is seated on surface 58. The adapter 12 may be installed in the mount 14 before or after the gasket 82 is placed on mount 14. After placing the gasket 82 on the mount, the mount is connected to the panel as previously described. Tightening of fastener 46, clamps the gasket 82 between the mount's mounting section and panel. Accordingly, the spring fingers 100, 101 projecting from the face 102, 104 of the gasket 82 facing the panels are pressed against the panel thereby forming grounding contact between the gasket and panel. Conversely, the spring tabs 100, 101 projecting from the opposite faces 102, 104 (the gasket 82 may be mounted with either face 102, 104 towards the panel 2) of the gasket 82 are pressed against the mounting section 48 thereby forming grounding contact between the gasket and mount 14. Gasket 82 hence effects grounding contact between the metal mount 14 and panel 2 around the hole 3 in the panel through which the mount is inserted. This shields against EMI emissions through the panel hole 3.

Figure 7:
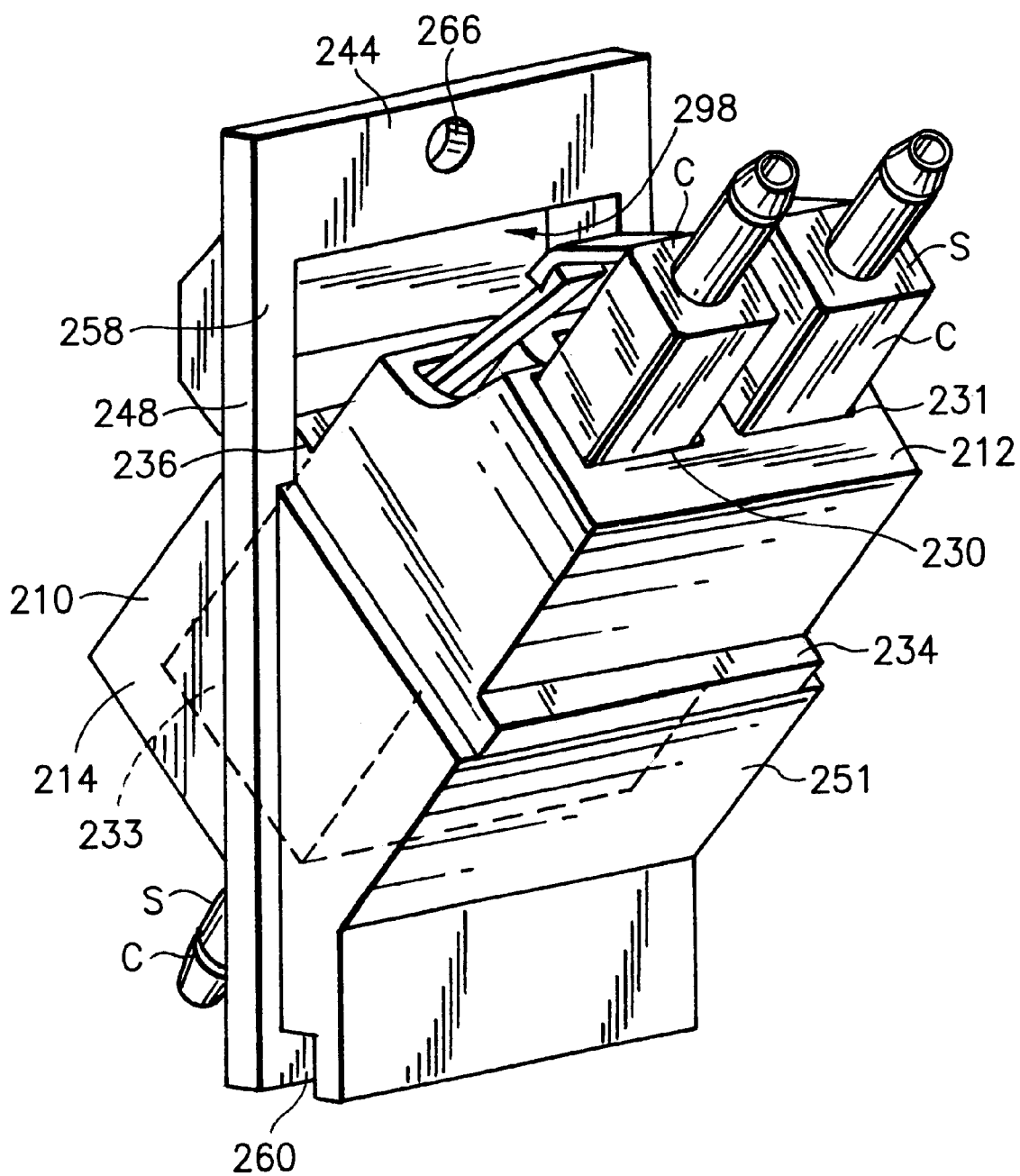
FIG. 7 is a perspective view of an optical connector assembly in accordance with a second preferred embodiment of the present invention, and multiple optical connectors coupled to the connector assembly.

Referring now to FIG. 7 there is shown a perspective view of an optical connector mount assembly 210 in accordance with a second preferred embodiment of the present invention, and a number of optical connectors C. Except as noted below, the mount assembly 210 in the second preferred embodiment is generally similar to mount assembly 10 described previously and shown in FIGS. 1–6, and similar features are similarly numbered. Mount assembly 210 also comprises a mount 214, an optical connector adapter 212, and a gasket 282 shown in FIG. 9. The adapter 212 in this case is a multiplex adapter for connecting sets of multiple connectors C to each other. The adapter 212 in FIG. 7 is shown as a duplex adapter for connecting one set S of two connectors C to another set S of two connectors C (from the bottom set, one connector C is seen and the second is hidden in the view shown in FIG. 7). However, in alternate embodiments, the adapter may be a triplex adapter for connecting sets of three optical connectors to each other, a quadriplex adapter or other suitable multiplex adapter. The duplex adapter 212 has two receiving areas 230, 231 for receiving two connectors C in one end, and another two receiving areas (not shown) at the opposite end for receiving the mating set S of connectors. Otherwise, the adapter 212 is substantially similar to adapter 12 described previously and shown in FIG. 2. As with adapter 12, the connectors C of the two connector sets coupled to the adapter 212 are generally aligned with the body of the adapter 212. The receiving areas 230, 231 of the adapter may be configured to mate with type SC connectors or small form factor (SFF) LC connectors. The connectors C in FIG. 7 are shown as being type LC connectors for example purposes. Adapter 212 also has a flange 234, extending generally perpendicular to the adapter body, which may be used for mounting the adapter 212 directly to a panel (not shown) similar to panel 2.

Figure 8:
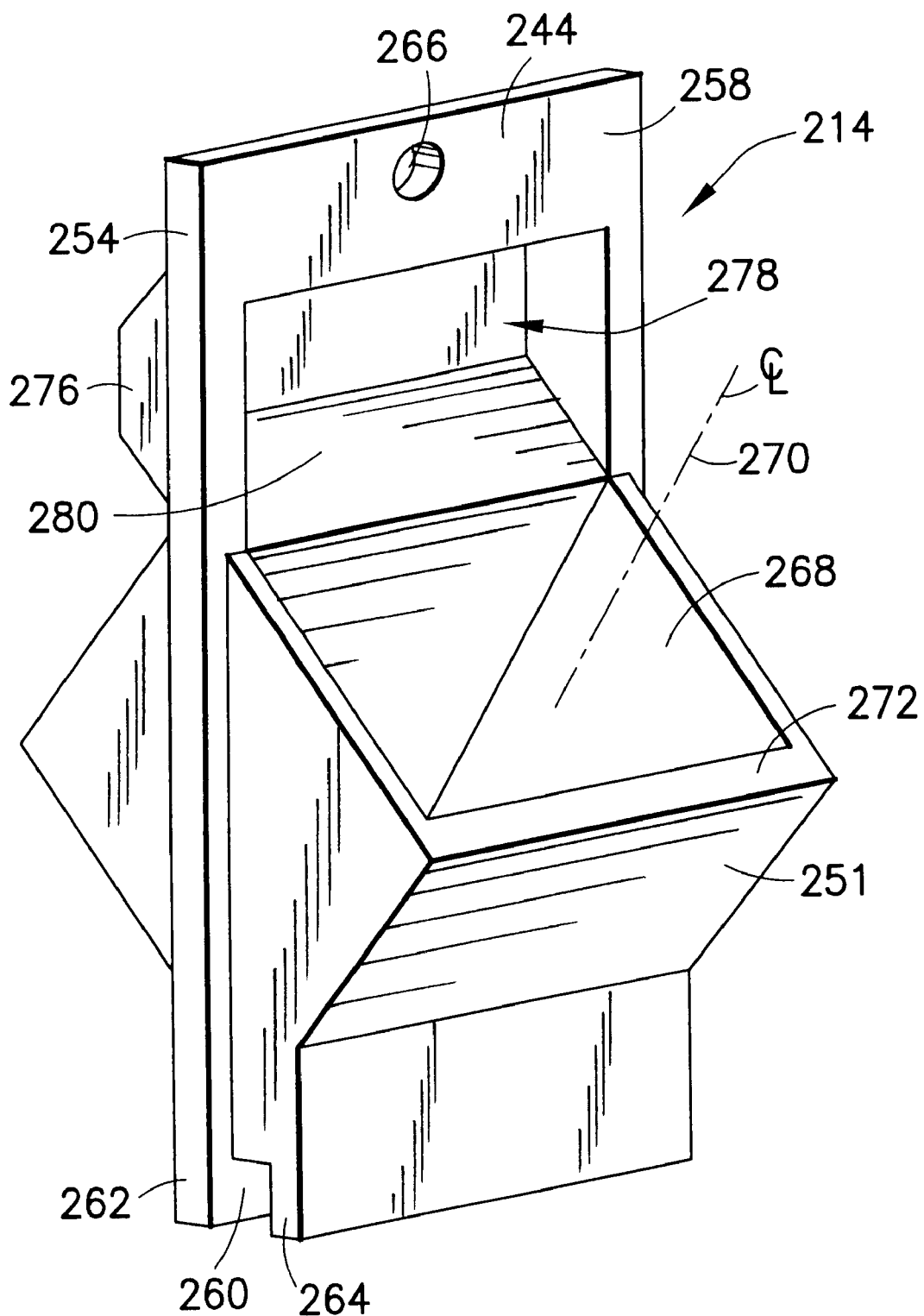
FIG. 8 is a perspective view of an adapter mount of the optical connector assembly shown in FIG. 7.
Figure 9:
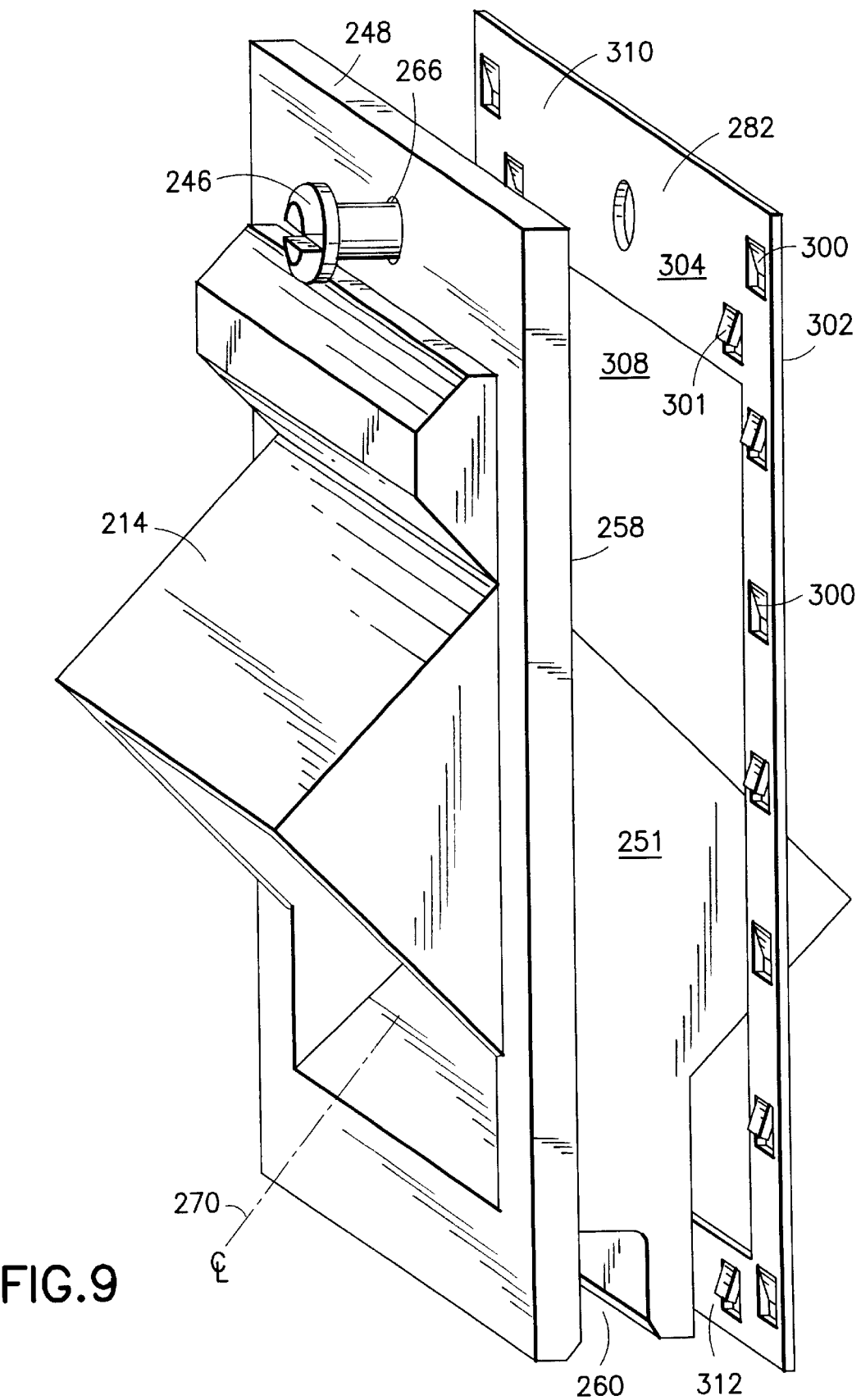
FIG. 9 is a perspective view of an opposite side of the adapter mount shown in FIG. 8 and a gasket of the optical connector assembly.

Referring now also to FIG. 8, the mount 214 is similar to mount 14 described before. Mount 214 also has a one piece frame 244 which is preferably made of metal such as aluminum alloy or steel. The frame 244 has a mount section 248, and an adapter housing 251. The housing 251 is tubular with a generally rectangular cross-section. As can be seen in FIGS. 8 and 9 the aperture 268 in the housing 267 extends through and is substantially aligned with the housing 251. Aperture 268 is sized to receive one end 233 of the duplex adapter 212 therein (see FIG. 7). The housing 251 has ledges 272, 280 respectively below and above the aperture 268 (as shown in FIG. 8) for seating flanges 234 of the adapter when the adapter is installed in the housing 251. Edges 272, 280 are oriented so that when the adapter 212 is seated on the ledges, the adapter 212 and hence the connectors C at each end of the adapter are aligned with the aperture centerline axis 270.

As shown in FIGS. 8 and 9, the mounting section 248 is disposed around the housing section 251, and has a first seating surface 258 which slanted or angled relative to the housing section 251. In the preferred embodiment, the seating surface 253 of the mounting section forms an acute angle (similar to Angle X in FIG. 3) with the housing section aperture centerline axis 270. In alternate embodiments, the seating surface and aperture centerline axis may be set at any other suitable acute angle. The upper portion 254 of the mounting section 243 has a fastener hole 266 for fastener 246 (see FIG. 9) which is used to secure the mounting section to a panel (similar to panel 2 in FIG. 1). The bottom 262 of the mounting section 248 has a groove 260 formed therein to lock the bottom of the mount to the bottom lip of a panel hole (similar to lip 4 of panel hole 3 in FIG. 1). As seen in FIG. 8, mounting section 248 also has a pocket or recess 273 to admit a portion 236 of the adapter flange thereby allowing the flange to be seated fully against ledge 280 without interfering with the mounting section. The recess is covered on one side by section 276.

Gasket 282 is shown in FIG. 9. The gasket 282 in the embodiment is substantially similar to gasket 82 described before and shown in FIGS. 5 and 6, except as noted below. The aperture 308 in gasket 282 is wider in order to accommodate the wider housing section 251 on mount 214 used with the duplex adapter 212. Otherwise, similar to gasket 82, gasket 282 is made of metal and has spring tabs 300, 301 projecting respectively from faces 302, 304 of the gasket. Gasket 282 also has a bottom section 213 sized to fit within the lower groove 260 in the mounting section 248.

Mount assembly 210 is mounted to a panel (similar to panel 2 in FIG. 1) in substantially the same manner as described before in regards to assembly 10. Gasket 282 is placed against seating surface 258 of the mounting section 248 on mount 214. The gasket 282 and mount 214 may then be placed against the panel. Substantially as shown in FIG. 1, a portion of the adapter housing 251 extends through the panel hole and the lower lip of the hole (similar to lip 4) is seated in groove 260 of mounting section 248. Portion 264 of the groove 260 serves to lock the bottom of the mount 214 to the panel. Fastener 246 is inserted through hole 266 and fastened to the panel. The adapter 212 may then be installed in the housing section 251. Otherwise, the adapter 212 may be installed in the housing section 251 before the mount 214 is mounted to the panel. After mount assembly 210 is mounted to the panel, the mount assembly appears in elevation substantially similar to assembly 10 shown in FIG. 1 mounted to panel 2. The centerline axis 270 of the aperture in the housing section 251 is angled at an acute angle to an axis normal to the panel (similar to axis 90 in FIG. 1). Hence, the duplex adapter 212 and the two connectors mated to each end of the adapter are also angled relative to the panel. As can be realized from FIGS. 1 and 7 the space envelope encompassing the connectors C mounted to the angled adapter 212 in mount 214 is considerably shorter than if the adapter was mounted perpendicular to the panel. Furthermore, open spaces in front and behind the adapter for inserting and removing the connectors C from angled adapter 212 are also significantly smaller (e.g. about 30% smaller for angle X of 45°) than if the adapter was mounted perpendicularly. The gasket 282 is clamped between the mounting section 248 and panel similar to gasket 82 shown in FIG. 1. The spring tabs 300, 301 respectively projecting from the opposing faces 302, 304 of the gasket 282 are resiliently biased against the panel and the seating surface 258 of the mounting section 248 thereby effecting grounding contact between the mount 214 and panel.

Figure 10:
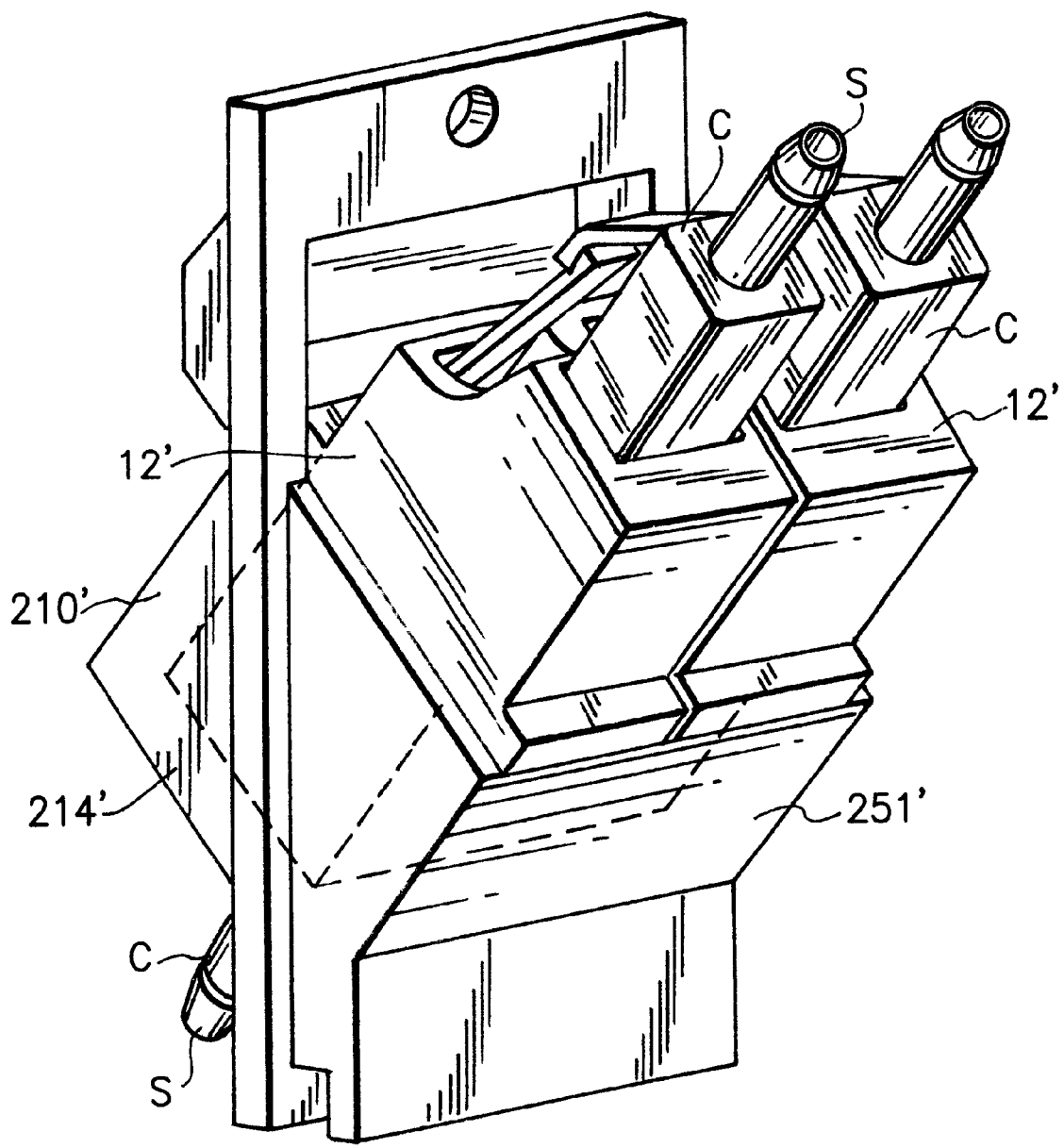
FIG. 10 is a perspective view of a n optical connector assembly in accordance with a third preferred embodiment of the present invention, and multiple optical connectors coupled to the connector assembly.

Referring now to FIG. 10, there is shown a perspective view of an optical connector mount assembly 210' in accordance with a third preferred embodiment of the present invention. Mount assembly 210' is similar to mount assembly 210 and similar features are similarly numbered. Mount assembly 210' is also used to couple sets S of multiple connectors C at an angle to a panel (similar to panel 2 in FIG. 1) similar to mount assembly 210. One difference, however, between mount assembly 210' and assembly 210 is that assembly 210' has multiple simplex adapters 12' in place of the one duplex adapter 212 in assembly 210. Each simplex adapter 12' is substantially the same as adapter 12 described before and shown in FIG. 2. Each simplex adapter 12' couples one connector C from a set S of multiple connectors at one end to another connector C from another set S of multiple connectors at the opposite end of the mount. In alternate embodiments, the mount assembly may have one or more simplex adapters adjacent to one or more multiplex adapters to couple any number of connectors to each other. The mount 214' of the mount assembly 210' has a housing section 251' sized to hold the simplex adapters 12' therein. In the preferred embodiment, the housing section 251' is sized to hold either two simplex adapters 12' in the configuration shown in FIG. 10 or one duplex adapter 212 in the configuration shown in FIG. 7. In either case, the adapters 212, 12' installed in the mount 214, 214' are held at an acute angle relative to an axis normal to the mounting panel (similar to axis 90 in FIG. 1).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical connector adapter mount for mounting an optical connector adapter to a panel, the mount comprising:

a conductive frame comprising a mounting section for attaching the mount to the panel, and a tubular housing section with an aperture adapted for connecting a multi-connector optical connector adapter to the panel, the adapter being sized and shaped to connect at least two pairs of optical connectors to each other, wherein the optical connector adapter comprises two or more optical connector adapters located side by side in the aperture, at least one of the two or more adapters being a simplex adapter;

wherein the mount is adapted to receive a shield gasket between a seating surface of the mount and the panel for forming an electrical connection between the mount and the panel, wherein the mounting section is slanted relative to the housing section, and wherein at least one section of the aperture is aligned with a hole in the panel and the pairs of optical connectors are angled relative to a normal axis of the panel when the mounting section is mounted to the panel.

2. An optical connector adapter mount for mounting an optical connector adapter to a panel, the mount comprising:

a conductive frame comprising a mounting section for attaching the mount to the panel, an EMI gasket connected to the mounting section, and a tubular housing section with an aperture adapted for connecting a multi-connector optical connector adapter to the panel, the adapter being sized and shaped to connect at least two pairs of optical connectors to each other, wherein the EMI gasket surrounds the housing section of the mount, and wherein the EMI gasket is sandwiched between a seating surface of the mounting section and the panel when the mounting section is mounted to the panel;

wherein the mount is adapted to receive a shield gasket between a seating surface of the mount and the panel for forming an electrical connection between the mount and the panel, wherein the mounting section is slanted relative to the housing section, and wherein at least one section of the aperture is aligned with a hole in the panel and the pairs of optical connectors are angled relative to a normal axis of the panel when the mounting section is mounted to the panel.

3. An optical connector adapter mount for mounting an optical connector adapter to a panel, the mount comprising:

a conductive frame comprising a mounting section for attaching the mount to the panel, an EMI gasket connected to the mounting section, and a tubular housing section with an aperture adapted for connecting a multi-connector optical connector adapter to the panel, the adapter being sized and shaped to connect at least two pairs of optical connectors to each other, wherein the EMI gasket has a hole therein through which the housing section is inserted;

wherein the mount is adapted to receive a shield gasket between a seating surface of the mount and the panel for forming an electrical connection between the mount and the panel, wherein the mounting section is slanted relative to the housing section, and wherein at least one section of the aperture is aligned with a hole in the panel and the pairs of optical connectors are angled relative to a normal axis of the panel when the mounting section is mounted to the panel.

4. A combined optical connector adapter and mount assembly comprising:

an optical connector adapter mount comprising a conductive frame comprising a mounting section for attaching the mount to the panel, and a tubular housing section with an aperture adapted for connecting a multi-connector optical connector adapter to the panel, the adapter being sized and shaped to connect at least two pairs of optical connectors to each other;

wherein the mount is adapted to receive a shield gasket between a seating surface of the mount and the panel for forming an electrical connection between the mount and the panel, further comprising at least one gasket disposed around the mount, the gasket being made from an EMI shielding material further wherein the mounting section is slanted relative to the housing section, and wherein at least one section of the aperture is aligned with a hole in the panel and the pairs of optical connectors are angled relative to a normal axis of the panel when the mounting section is mounted to the panel; and at least one optical connector adapter connected to the mount, wherein the at least one adapter is adapted to connect a set of the optical connectors at one end of the at least one adapter to another set of the optical connectors at another end of the at least one adapter, wherein at least one optical connector from the set of optical connectors is disposed at an acute angle relative to a center axis of the hole.

* * * * *